United States Patent Office 3,172,866
Patented Mar. 9, 1965

3,172,866
METHOD OF PREPARING ALUMINA CATALYST CARRIERS AND THE PRODUCT THEREOF
Paul Belon, Salindres, Gard, France, assignor to Pechiney, Compagnie de Produits Chimiques et Electrometallurgiques, Paris, France
No Drawing. Filed May 8, 1961, Ser. No. 108,282
Claims priority, application France, May 10, 1960, 826,719
9 Claims. (Cl. 252—463)

This invention relates to methods for the preparation of catalyst carriers, and it relates more particularly to a method for the production of porous aluminum oxide carriers or catalysts of the type used in the conversion of propane to lighting gas and for the production of ethylene oxide. The present invention further includes novel catalyst carrier products resulting from the inventive methods.

It has long been the practice of the art to impregnate or coat carriers with active catalytic substances in order to more readily introduce or distribute the carrier substances during a treating operation. For example, metallic salts are coated onto the surfaces or impregnated into catalyst carriers and then employed for the conversion of propane to lighting gas or for the production of ethylene oxide.

The physical properties of the catalyst carrier have an important bearing on the quality of the catalytic masses obtained either by impregnating or by coating the carrier with the active substance. It is, for example, absolutely necessary that the active substance be strongly bound with the carrier in order that separation of the substance from the carrier will not occur in the course of handling or utilization of the catalyst. In light of this consideration, the impregnation method has been favored by the art since the tendency for the active substance to be separated from the carrier is materially reduced.

The impregnation of carriers with catalytic substances requires that a porous carrier be employed and it has been found that the size of the pores in the carriers is critical to efficient use of the carriers for the designated purposes. Furthermore, the specific surface area of the carriers, which area controls the adsorption phenomena and also contributes to catalyst activity, is an extremely important characteristic of the carriers. In many cases, a large surface area is detrimental to efficient operation, and therefore, the surface area must be kept within a preferred minimum range between a few square meters and one square decimeter.

Where a carrier is characterized by pores with a diameter less than 0.1 micron, there is a natural increase in surface area which is not suitable for the adsorption of fluids. On the other hand, it has been found that where a carrier is characterized by pores of a diameter above 0.1 micron and up to about 8.0 microns, the channels do not unduly increase the specific surface area of the carriers and efficient use of the carriers is therefore possible.

It therefore becomes an object of this invention to provide improved and efficient porous carriers suitable for impregnation with catalytic substances.

It is an additional object of this invention to produce porous catalyst carriers having a specific surface area which promotes effective use of the carriers with the catalytic substance impregnated therein.

It is a further object of this invention to provide catalyst carriers composed of porous aluminum oxide which are characterized by pores of a diameter between 0.1 and 8.0 microns, said carriers having ideal surface areas which are conducive to effective treatment of desired materials.

These and other objects of this invention will hereinafter appear, and it will be understood that the specific examples hereinafter set forth are provided for purposes of illustration only.

The present invention concerns a process for the preparation of a catalyst carrier which exhibits strong macroporosity, the pores therein having a diameter between 0.1 and 8.0 microns and which also exhibits a reduced specific surface area between a few square meters and one square decimeter per gram. The present invention further includes the catalyst carriers having these characteristics obtained from the inventive process.

The process to which this invention is directed consists in employing as a raw material mixtures comprising active aluminum oxide, calcined aluminum oxide, and a small proportion of boron oxide. The mixtures so composed are subjected to heating at high temperatures, generally between 1600 and 1800° C. in order to cause sintering of the aluminum oxide. The carriers may be recovered in the form of balls, granules, rings or the like, the desired shape being achievable by first forming the above-noted mixture into a thick paste by adding water to the mixture, forming the material into the desired shape, and then performing the heating operation.

If active aluminum oxide alone were employed to produce the carrier material, an extremely rapid decrease in the porous volume of the material would take place when the aluminum oxide was subjected to temperatures of the order of 1600° C. Simultaneously, a further distinct shrinkage of the mass of active aluminum oxide would occur and this would render the material extremely brittle. For this reason, active aluminum oxide alone is not suitable for the desired purposes.

When active aluminum oxide is mixed with calcined aluminum oxide (25 to 400 parts by weight calcined or sintered aluminum oxide per 100 parts by weight active aluminum oxide) and when this mixture is calcined between 1600 and 1650° C., it will retain after sintering a large macroporous volume and it will not undergo any distinct shrinkage. However, catalyst carriers prepared in this way have a specific surface area between 1 and 5 square meters per gram, which is not suitable for certain catalysis operations. In order to reduce the specific surface area, it has been found necessary to raise the calcination temperature above 1650° C. However, in the course of heating the mixture of active and calcined aluminum oxide above 1650° C., the porosity of the carrier will decrease rapidly outside the desired range described above.

It has been found that to achieve the results which are the objects of this invention, that is, to provide a carrier with pores within a given range and a specific surface area within a given range, certain additives must be employed along with aluminum oxide. Thus, the present invention overcomes the aforementioned difficulties by adding amounts of boron oxide to the active and calcined aluminum oxide. The present invention promotes the raising of the calcination temperature above 1650° C., thus achieving a decrease in the specific surface area without decreasing the porous volume of the carriers to any great extent.

The present process specifically consists of adding to the mixture of calcined and active aluminum oxide a small proportion of boron oxide. This ingredient, when added in small proportions does not change the starting sintering temperature for the aluminum oxide mixture. It does, however, permit the raising of the calcination temperature up to about 1800° C. without any noticeable reduction in porous volume. Thus, where boric anhydride is added to aluminum oxide mixture and calcination for twenty minutes to one hour between 1600 and 1800° C. takes place, the products of this invention are produced.

Boric acid is desirably employed to provide the boron oxide additives and it may be added to the mixture in quantities from .02 to 5% by weight of the aluminum oxide. If the mass is heated in a single step in a furnace, the quantity should be between about 0.1 and 5% and preferably between 0.5 and 2% because in the course of heating, boric anhydride will sublime before the mass has reached sintering temperature. On the other hand, if continuous calcination is effected wherein the mass is progressively passed from a cold to a hot zone in a tube furnace, amounts of boric acid from .02 to 0.1% may be employed. With the continuous operation, the boric anhydride in the course of calcination will volatilize and then condense in the cold parts of the furnace which therefore become rich in boron oxide. Other compounds reducible to boron oxide under the reaction temperatures existing can be employed to provide equivalent amounts of boron oxide.

Continuous calcination of the mixtures comprising active aluminum oxide, calcined aluminum oxide and boron oxide constitutes a preferred embodiment of this invention. A further preferred procedure involves the addition of the boron oxide to an amount of aluminum oxide during calcination thereof and prior to mixing of the calcined aluminum oxide with the active aluminum oxide.

Aluminum oxide granules obtained by this process are extremely resistant to crushing and have a specific surface area lower than 0.5 square meter per gram. The porous volume of the granules which is the measure of the quantity of liquid which may be absorbed is of the order of 5 to 20 cubic centimeters per 100 grams. The porous volume will vary according to the proportions of calcined and active aluminum oxide in the mixture and also according to the fineness of the calcined aluminum oxide. Maximum porosity is obtained with a mixture containing 75 to 100 parts of active aluminum oxide per 100 parts calcined aluminum oxide. The mechanical strength of the granules increases with the fineness of the aluminum oxide. However, the porosity of the granules will decrease when the grain size of the calcined aluminum oxide is too fine. Best results are obtained when the average size of calcined aluminum oxide particles lies between 15 and 50 microns.

A non-limiting example of the production of the granules of this invention may be described as follows:

*Example I*

1000 parts active aluminum oxide obtained by pulverizing aluminum oxide trihydrate in a current of hot gases was mixed with 1000 parts calcined aluminum oxide having a particle size not larger than 20 microns and calcined at 1200° C. One part boric anhydride was added to the aluminum oxide. The mixture was provided with a small amount of water until a thick paste was formed and the paste was inserted in a comfit box so as to make balls of approximately 3 mm. diameter. The balls were dried by heating at about 110° C. and then passed continuously into a tube furnace having a hot zone maintained at 1700° C. The speed of the mass of balls was maintained so that the balls were retained in the hot zone of the furnace for about thirty minutes. Upon cooling of the heated mixture, the balls were found to have a specific surface area less than 0.5 square meter per gram and a porous volume of approximately 16 cubic centimeters per 100 grams. The crushing strength as measured by pressing between two plane surfaces was higher than 100 kg. The wear resistance of the material as measured by the percentage of the product which would not pass through a vibrating sieve having an orifice size of 200 microns after 10 minutes of vibration was 98.5%.

*Example II*

Balls 2 mm. in diameter were prepared as above from a mixture containing 100 parts calcined aluminum oxide containing 250 parts per million boron and 80 parts active aluminum oxide. The balls were baked at 1800° C. for one hour and at a porous volume of 24 cubic centimeters per 100 grams and a specific surface area of 0.1 square meter per gram.

*Example III*

A process substantially the same as set forth in Example II was repeated. However, calcined aluminum oxide free of boron was employed. To the mixture of active and calcined aluminum oxide there was added 0.5% boron in the form of boric acid. After sintering, a porous volume of 14 cubic centimeters per 100 grams and a specific surface area of 0.13 square meter per gram was obtained. The crushing strength and wear resistance measured as above was 100 kg. and 99.2%, respectively.

It will be understood that various modifications may be made in the above disclosed process for the preparation of improved catalyst carriers, which modifications provide the characteristics of this invention without departing from the spirit of this invention, particularly as defined in the following claims.

I claim:

1. A method for the production of aluminum oxide carriers for catalysts comprising the steps of mixing 100 parts by weight of active aluminum oxide which is equivalent to the aluminum oxide obtained by heating hydrated aluminum oxide with from 25 to 400 parts by weight calcined aluminum oxide and with from .02 to 5% by weight boric oxide, and heating the mixture at a temperature between 1600 and 1800° C.

2. A method according to claim 1, wherein the heating of the mixture takes place for from twenty minutes to one hour.

3. A method according to claim 1, wherein the boric oxide is introduced into the calcined aluminum oxide prior to mixing with the active aluminum oxide.

4. A method for the production of aluminum oxide carriers for catalysts comprising the steps of continuously introducing a mixture of 100 parts by weight active aluminum oxide which is equivalent to the aluminum oxide obtained by pulverizing aluminum oxide trihydrate in a current of hot gases, 25 to 400 parts by weight calcined aluminum oxide, and .02 to 5% by weight boric oxide into a tube furnace having a hot region maintained between 1600 and 1800° C. and continuously withdrawing the carriers from said furnace.

5. A method according to claim 4, wherein said mixture is maintained within said hot region for from twenty minutes to one hour.

6. A method according to claim 4, wherein the boric oxide is introduced into the calcined aluminum oxide prior to mixing with the active aluminum oxide.

7. A method for the production of aluminum oxide carriers for catalysts comprising the steps of mixing 75 to 100 parts by weight active aluminum oxide which is equivalent to the aluminum oxide obtained by pulverizing aluminum oxide trihydrate in a current of hot gases with 100 parts by weight calcined aluminum oxide and with from .02 to 5% by weight boric oxide, and heating the mixture at a temperature between 1600 and 1800° C.

8. A method for the production of aluminum oxide carriers for catalysts comprising the steps of continuously introducing a mixture of 75 to 100 parts by weight active aluminum oxide which is equivalent to the aluminum oxide obtained by pulverizing aluminum oxide trihydrate in a current of hot gases, with 100 parts by weight calcined aluminum oxide, and from .02 to 0.1% by weight boric oxide into a tube furnace having a hot region maintained between 1650 and 1800° C. and continuously withdrawing the said carriers from said furnace.

9. An aluminum oxide catalyst carrier produced by mixing 100 parts by weight of active aluminum oxide which is equivalent to the aluminum oxide obtained by pulverizing aluminum oxide trihydrate in a current of hot gases with from 25 to 400 parts by weight calcined aluminum oxide and with from .02 to 5% by weight boric oxide, and heating the mixture at a temperature between 1600 and 1800° C.

References Cited in the file of this patent

UNITED STATES PATENTS

| | | |
|---|---|---|
| 2,976,333 | Dixon et al. | Mar. 21, 1961 |
| 3,026,177 | St. Pierre et al. | Mar. 20, 1962 |